(12) United States Patent
Blackburn et al.

(10) Patent No.: US 12,034,496 B1
(45) Date of Patent: Jul. 9, 2024

(54) ACTIVE MODULE FOR HIGH-SPEED CABLE ASSEMBLY

(71) Applicant: TE Connectivity Solutions GmbH, Schaffhausen (CH)

(72) Inventors: Christopher William Blackburn, Bothell, WA (US); Kyle Robert Sammon, San Francisco, CA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 22 days.

(21) Appl. No.: 18/084,586

(22) Filed: Dec. 20, 2022

(51) Int. Cl.
*H04W 12/06* (2021.01)
*H04B 3/36* (2006.01)

(52) U.S. Cl.
CPC ..................... *H04B 3/36* (2013.01)

(58) Field of Classification Search
CPC ....... H04W 12/06; H04W 4/70; H04W 12/40; H04W 12/02; H04W 12/04; H04W 40/005; H04W 52/0216; H04W 52/0235; H04L 63/0435; H04L 12/2854; H04L 2209/24; H04L 2209/72; H04L 2209/805; H04L 63/0272; H04L 63/0442; G06F 13/14; G06F 1/26; G06F 13/00; G06F 13/1684; G06F 13/4027; G06F 13/4243; G06F 13/4247; G06F 11/2236

USPC .......................................................... 375/211
See application file for complete search history.

(56) References Cited

U.S. PATENT DOCUMENTS

| | | | |
|---|---|---|---|
| 7,712,976 B2 | 5/2010 | Aronson et al. | |
| 10,095,653 B2 | 10/2018 | McGowan | |
| 10,498,561 B2 | 12/2019 | Johnson | |
| 10,659,337 B2 | 5/2020 | Raini et al. | |
| 10,789,201 B2 | 9/2020 | Wu et al. | |
| 11,116,072 B2 | 9/2021 | Liao et al. | |
| 2003/0093702 A1* | 5/2003 | Luo | G06F 1/32 713/320 |
| 2015/0163056 A1* | 6/2015 | Nix | H04L 9/0869 |
| 2016/0196233 A1* | 7/2016 | Chen | G06F 13/4295 710/106 |
| 2019/0068397 A1* | 2/2019 | Chen | H04L 12/40 |
| 2019/0097794 A1* | 3/2019 | Nix | H04L 9/3249 |

* cited by examiner

*Primary Examiner* — Eva Y Puente

(57) ABSTRACT

A cable assembly includes cables extending between a first end configured to be coupled to a first communication component and a second end configured to be coupled to a second communication component. Each cable defines a data channel including a first portion extending to the first end and a second portion extending to the second end. The cable assembly includes an in-line active module coupled to the cables at an intermediate location between the first end and the second end. The in-line active module includes a repeater device restoring signals transmitting along the channels at the intermediate location.

20 Claims, 7 Drawing Sheets

ACTIVE MODULE FOR HIGH-SPEED CABLE ASSEMBLY

BACKGROUND OF THE INVENTION

The subject matter herein relates generally to cable assemblies.

Cable assemblies are used to electrically connect various components within a system, such as a server or network system. The cable assemblies extend between the components, such as network, compute, storage, memory, or other components. The components may be arranged in shelves or trays of a network rack. Some systems may include components such as cards, such as line cards, daughter cards, mother boards, and the like. Each cable assembly includes multiple cables arranged in a bundle or array. Each cable forms a data channel. However, high speed channel budgets are decreasing as speeds increase, which results in shorter allowable cable lengths. Some systems utilize active devices, such as re-drivers or re-timers at the component interfaces to extend cable reach and enable smaller cable diameters. However, the cable lengths are limited at high data speeds.

BRIEF DESCRIPTION OF THE INVENTION

In one embodiment, a cable assembly is provided and includes cables extending between a first end configured to be coupled to a first communication component and a second end configured to be coupled to a second communication component. Each cable defines a data channel including a first portion extending to the first end and a second portion extending to the second end. The cable assembly includes an in-line active module coupled to the cables at an intermediate location between the first end and the second end. The in-line active module includes a repeater device restoring signals transmitting along the channels at the intermediate location. The in-line active module includes a housing having a chamber and a module circuit board received in the chamber. The repeater device is mounted to the module circuit board and located in the chamber. The first portion of the cable extends into the chamber at a first end of the housing and the second portion of the cable extends into the chamber at a second end of the housing.

In another embodiment, a cable assembly is provided and includes cables extending between a first end configured to be coupled to a first communication component and a second end configured to be coupled to a second communication component. The cables include transmit cables and receive cables. Each transmit cable defines a transmit channel includes a first transmit portion extending to the first end and a second transmit portion extending to the second end. Each receive cable defines a receive channel includes a first receive portion extending to the first end and a second receive portion extending to the second end. The cable assembly includes a transmit in-line active module coupled to the transmit cables at a first intermediate location between the first end and the second end. The transmit in-line active module includes a transmit repeater device restoring transmit signals transmitted along the transmit channels at the first intermediate location. The cable assembly includes a receive in-line active module coupled to the receive cables at a second intermediate location between the first end and the second end. The receive in-line active module includes a receive repeater device restoring receive signals transmitted along the receive channels at the second intermediate location.

In a further embodiment, a communication system is provided and includes a first communication component having a first interface. The communication system includes a second communication component having a second interface. The communication system includes a cable assembly extending between the first and second interfaces to transmit data between the first communication component and the second communication component. The cable assembly includes cables extending between a first end coupled to the first communication component and a second end coupled to the second communication component. Each cable defines a data channel includes a first portion extending to the first end and a second portion extending to the second end. The cable assembly includes an-in-line active module coupled to the cables at an intermediate location between the first end and the second end. The in-line active module includes a repeater device restoring signals transmitting along the channels at the intermediate location. The in-line active module includes a housing having a chamber and a module circuit board received in the chamber. The repeater device is mounted to the module circuit board and located in the chamber. The first portion of the cable extends into the chamber at a first end of the housing and the second portion of the cable extends into the chamber at a second end of the housing.

DETAILED DESCRIPTION OF THE INVENTION

Figure 1:
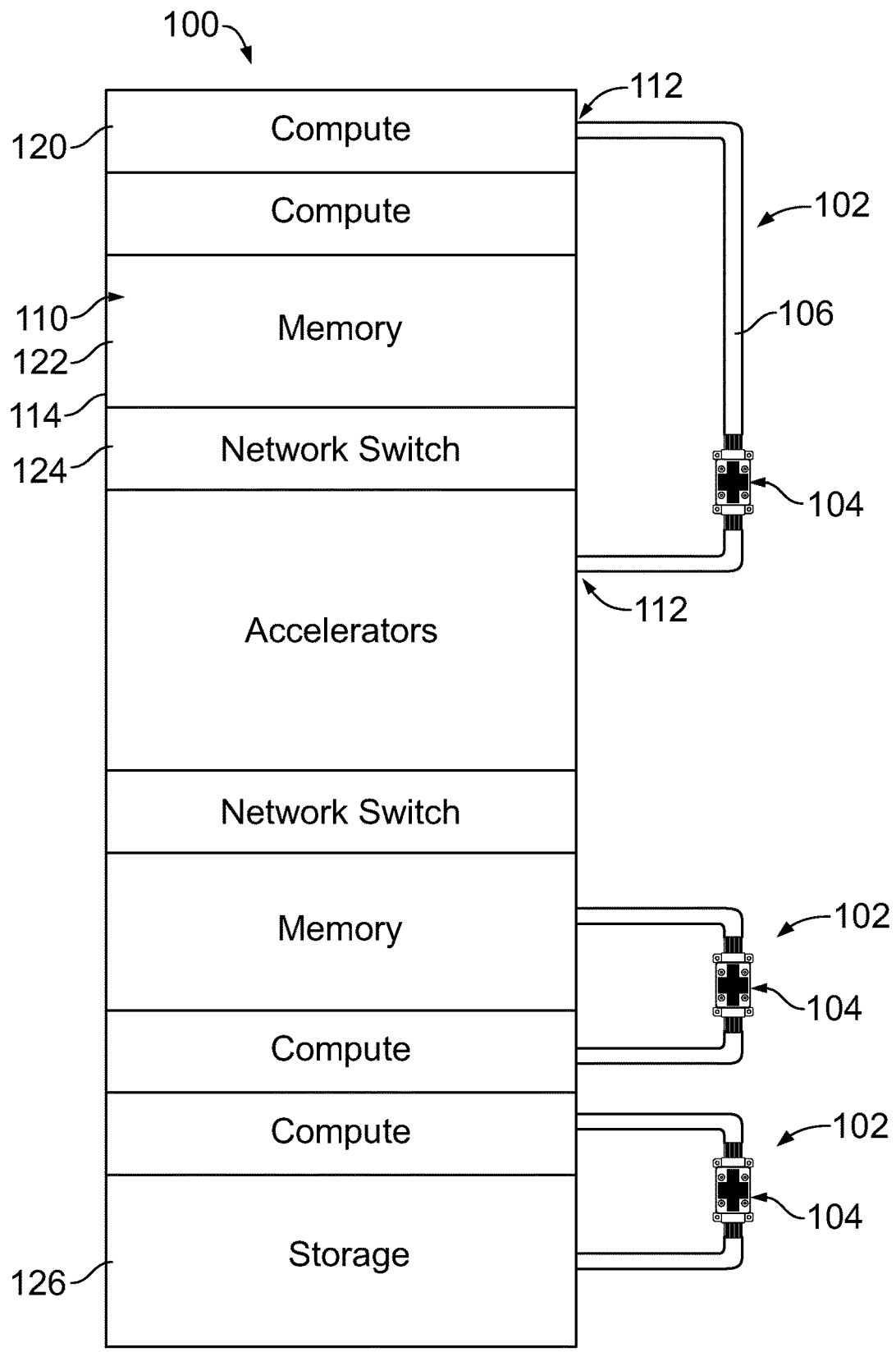
FIG. 1 is a schematic illustration of a communication system in accordance with an exemplary embodiment.

FIG. 1 is a schematic illustration of a communication system 100 in accordance with an exemplary embodiment. The communication system 100 includes one or more cable assemblies 102 used to communicatively couple communication components 110 along signal paths. The cable assembly 102 provides active signaling to transmit the signals between the communication components 110. In an exemplary embodiment, the cable assembly 102 includes an in-line active module 104 coupled to cables 106 of the cable assembly 102 to restore or enhance signals transmitted along the cables 106. The cable assemblies 102 may connect between any of the various communication components 110. Optionally, multiple cable assemblies 102 may be connected to any of the various communication components 110.

Each communication component 110 includes an interface 112 for interfacing with the cable assembly 102. The communication component 110 is configured to transmit and/or receive data with the cable assembly 102 through the interface 112. The interface 112 may be a connector, such as a plug or receptacle connector having contacts configured to be mated with a complimentary connector at the end of the cable assembly 102. The interface 112 may be a card edge configured to be plugged into a card edge connector at an end of the cable assembly 102. The interface 112 may be solder pads configured to be soldered directly to the cables 106 of the cable assembly 102. Other types of interfaces may be used in alternative embodiments to provide a connection between the communication component 110 and the cable assembly 102.

In the illustrated embodiment, the communication system 100 is a network system having network components. For example, the communication components 110 include one or more compute nodes 120, one or more memory modules 122, one or more network switches 124, one or more storage devices 126, one or more network accelerators, or other types of communication components. The cable assembly 102 may be used in other types of communication systems other than a network system in alternative embodiments. The communication system 100 may include a rack 114 holding the communication components 110. In alternative embodiments, the communication components may be standalone components.

Figure 2:
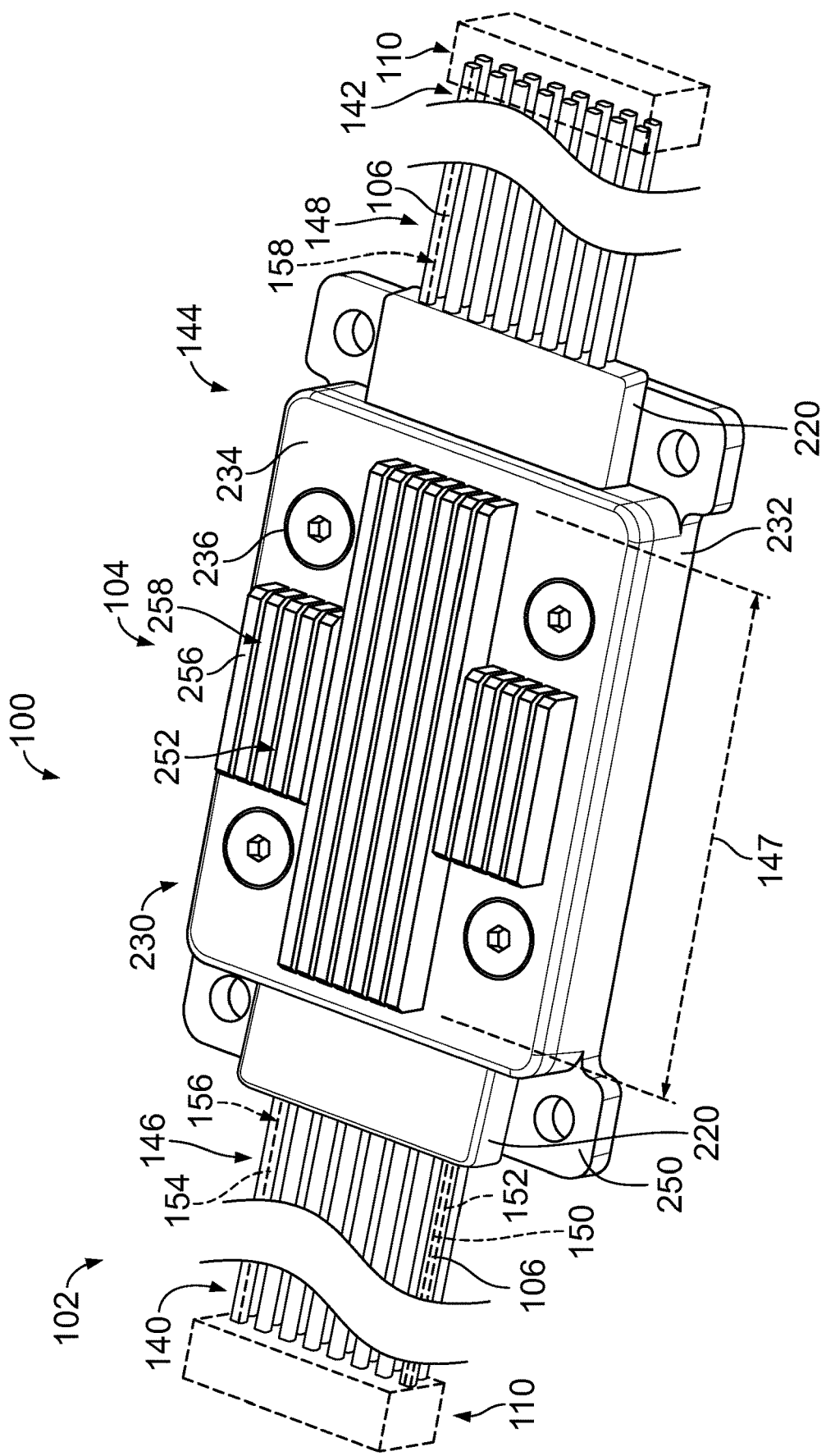
FIG. 2 is a perspective view of the cable assembly in accordance with an exemplary embodiment.
Figure 3:
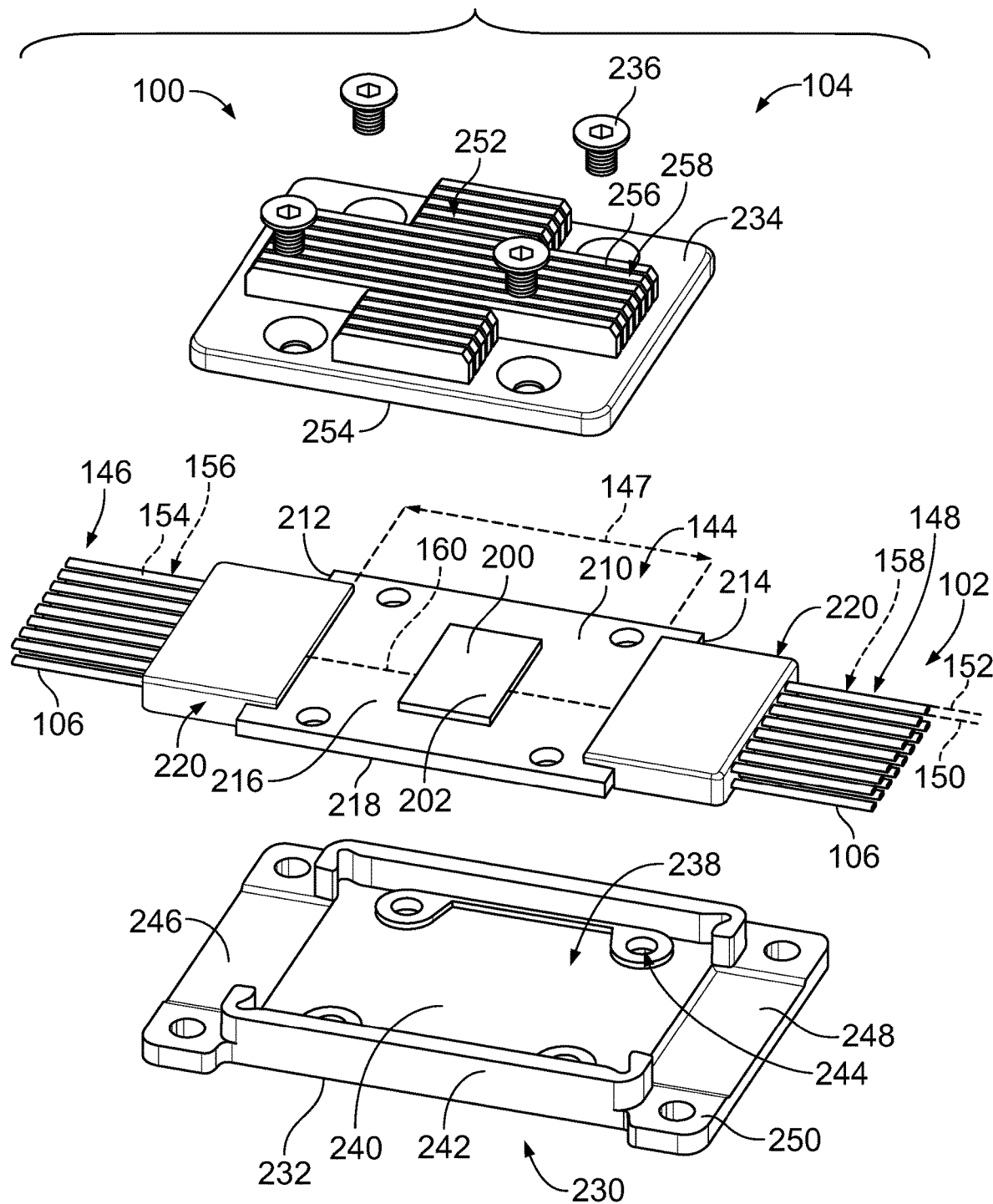
FIG. 3 is an exploded view of the cable assembly in accordance with an exemplary embodiment.

FIG. 2 is a perspective view of the cable assembly 102 in accordance with an exemplary embodiment. FIG. 3 is an exploded view of the cable assembly 102 in accordance with an exemplary embodiment. The cable assembly 102 includes the cables 106 and the in-line active module 104 coupled to the cables 106. The cables 106 may be split at the in-line active module 104 having the corresponding cable sections extending from opposite sides of the in-line active module 104. For example, the cables 106 are discontinuous between the ends of the cables 106 with the in-line active module 104 located in line with the cables 106 at the area of discontinuity of the cables 106.

The cables 106 extend between a first end 140 and a second end 142. The first end 140 is configured to be coupled to a first communication component 110 (FIG. 1) and the second end 142 is configured to be coupled to a second communication component 110. The in-line active module 104 is coupled to the cables 106 at an intermediate location 144 between the first end 140 and the second end 142. For example, the in-line active module 104 is located remote from the first end 140 and is located remote from the second end 142. The cables 106 include first sections 146 between the first end 140 and the in-line active module 104. The cables 106 include second sections 148 between the second end 142 and the in-line active module 104. The cables 106 have gaps 147 between the first and second sections 146, 148. The gaps 147 define the intermediate location 144. The in-line active module 104 is located at the gaps 147. The in-line active module 104 spans across the gaps 147 to connect the first and second sections 146, 148.

In various embodiments, the intermediate location 144 may be approximately centered between the first and second ends 140, 142. For example, the first and second sections 146, 148 may have approximately equal lengths. In other embodiments, the intermediate location 144 may be located closer to one of the ends, such closer to the first end 140 or closer to the second end 142 such that the first and second sections 146, 148 have different lengths. The intermediate location 144 may be selected based on channel lengths of the transmission lines, such as being located near an end of an allowable channel length per protocol specification, such as PCIe, Ethernet, Infiniband, NVlink, and the like.

In an exemplary embodiment, each cable 106 is a twinaxial cable having a first conductor 150 and a second conductor 152 in a core of the cable 106. The conductors 150, 152 define data channels 154 for the cable 106. The data channels 154 extend between the first end 140 in the second end 142. The data channels are configured to be coupled to the first and second communication components 110 to transmit data signals between the first and second communication components 110. The twinaxial cable has two data channels 154. The conductors 150, 152 may form a differential pair. The cable 106 may include shielding, such as an outer braid or foil surrounding the conductors 150, 152. Other types of cables may be provided in alternative embodiments, such as coaxial cables having a single center conductor forming a single data channel 154 or a flat flexible cable having multiple conductors arranged in a flat or planar array in other various embodiments, the cables 106 may be defined by a flex circuit having a plurality of conductors.

In an exemplary embodiment, the data channel 154 is split at the in-line active module 104 between a first portion 156 and a second portion 158. The in-line active module 104 connects the first portion 156 with the corresponding second portion 158 to complete the data channel 154 through the cable assembly 102. For example, the data channel 154 includes an active module section 160, through the in-line active module 104, connecting the first portion 156 with the corresponding second portion 158. The first portion 156 extends along the first section 146 of the cable 106. For example, the first portion 156 extends between the first end 140 and the in-line active module 104. The second portion 158 extends along the second section 148 of the cable 106. For example, the second portion 158 extends between the second end 142 and the in-line active module 104. The in-line active module 104 is configured to restore signals transmitted along the data channels 154, such as between the first and second sections 146, 148.

In an exemplary embodiment, the in-line active module 104 includes a repeater device 200 to restore signals transmitted along the channels 154 at the intermediate location 144. In various embodiments, the repeater device 200 includes an integrated circuit 202. The repeater device 200 operates as a channel reach extension device to extend the transmission line length along the channels 154. For example, when the channel length of the channel 154 between the first communication component 110 and the second communication component 110 is longer than an allowable channel length, such as per protocol specifications, the repeater device 200 restores the signals in-line such that the distance between the first communication component 110 and the repeater device 200 is shorter than the allowable channel length and the distance between the second communication component 110 and the repeater device 200 is shorter than the allowable channel length. The repeater device 200 allows reliable, error-free communication between the first and second communication components 110. The repeater device 200 is configured to restore the signals at some point midway between the ends 140, 142 of the cables 106.

The repeater device 200 may be a re-timer device in various embodiments. The re-timer device is configured to retransmit a fresh copy of the original signal. The re-timer device may be a mixed signal analog/digital device that is protocol-aware and has the ability to fully recover the data, extract the embedded clock and retransmit a fresh copy of the data using a clean clock. The re-timer device may include a continuous time linear equalizer (CTLE) and a wideband gain stage. The re-timer device may include a clock and data recovery (CDR) circuit, a decision feedback equalizer (DFE) and a transmit (Tx) finite impulse response (FIR) driver. The re-timer device may include a finite state machines (FSMs) and/or a microcontroller to manage the automatic adaptation of the CTLE, wideband gain, DFE and FIR driver, and implement a link training and status state machine (LTSSM). The re-timer device may actively participate in the protocol. The re-timer device may fully recover the data stream and retransmit the data signal on a clean clock to enable extension of the channel to twice the original specification. The DFE of the re-timer device compensates for reflections in the channel response caused by impedance discontinuities in board vias, connectors and package socket-board interfaces along the data transmission line. The re-timer device may examine the received signal and adjust the CTLE and DFE to minimize the bit error rate (BER). The transmitter of the re-timer device may adjust de-emphasis and pre-shoot equalization to minimize BER according to equalization protocol. The re-timer device may have tools for assessing the electrical performance (internal eye monitors, pattern generators, pattern checkers) and protocol performance (link state history monitors, timeout adjustments). The re-timer device may compensate and reset any lane-to-lane skew, effectively doubling the specification budget.

The repeater device 200 may be a re-driver device in various embodiments. The re-driver device is configured to amplify the signal that is transmitted downstream of the re-driver device. The re-driver device may be an analog reach extension device designed to boost the high-frequency portions of the signal, such as to counteract frequency-dependent attenuation along the channel 154. The re-driver device may include a continuous time linear equalizer (CTLE), a wideband gain stage and a linear driver. The re-driver device may include receive (RX) side equalizer (EQ) to compensate for frequency-dependent attenuation due to PCB traces or cable conductors along the transmission line. The CTLE may function to open the closed eye of the distorted waveform. The transmit (TX) side of the re-driver device may include a pre-emphasis function (transmit equalizer) to pre-shape the transmit waveform.

The in-line active module 104 includes a module circuit board 210 having a first end 212 and a second end 214. The module circuit board 210 includes an upper surface 216 and a lower surface 218. The integrated circuit 202 may be provided at the upper surface 216 and connected to circuits of the module circuit board 210. Other electrical components may be mounted to the module circuit board 210 at the upper surface 216 and/or the lower surface 218, such as capacitors, transistors, resistors, memory components, microcontrollers, EEPROM devices, and the like.

The cables 106 are coupled to the module circuit board 210. For example, the first sections 146 of the cables 106 may be coupled to the first end 212 of the module circuit board 210 and the second sections 148 of the cables 106 may be coupled to the second end 214. In various embodiments, the first and second sections 146, 148 are terminated directly to the module circuit board 210. For example, the conductors 150, 152 at the terminating ends of the cables may be soldered directly to circuits of the module circuit board 210, such as pads or traces proximate to the ends 212, 214. Optionally, the first and second sections 146, 148 may be coupled to the upper surface 216 and/or the lower surface 218. In an exemplary embodiment, cable holders 220 are provided at the terminating ends of the sections 146, 148 of the cables 106. The cable holders 220 holds the cables 106 relative to each other. The cable holders 220 may hold the cables 106 relative to the module circuit board 210. For example, the cable holders 220 may be coupled to the ends 212, 214 of the module circuit board 210. The cable holders 220 may provide strain relief for the solder joints between the conductors 150, 152 and the module circuit board 210. In various embodiments, the cable holders 220 are overmolded in place over the ends of the sections 146, 148 and the ends 212, 214 of the module circuit board 210.

In alternative embodiments, rather than directly terminating the conductors 150, 152 to the module circuit board 210, the conductors 150, 152 may be terminated to contacts which are mated to the module circuit board 210. For example, the conductors 150, 152 may be soldered to the contacts or crimped to the contacts. The contacts may be held in a housing to form a connector, such as a card edge connector configured to be plugged onto the first end 212 and/or the second end 214.

The in-line active module 104 includes a housing 230 holding the module circuit board 210. In an exemplary embodiment, the housing 230 is a multipiece housing. For example, the housing 230 includes a base 232 and a lid 234 coupled to the base 232, such as using fasteners 236. The base 232 includes a chamber 238 that receives the module circuit board 210 and the repeater device 200. The lid 234 holds the module circuit board 210 in the chamber 238. In an exemplary embodiment, the base 232 includes a base wall 240 and side walls 242 extending from the base wall 240 to form the chamber 238. The base wall 240 includes openings 244 that receive the fasteners 236. The openings 244 may be threaded. In an exemplary embodiment, the base 232 includes first and second cable supports 246, 248 that support the terminating ends of the sections 146, 148 of the cables 106. The cable supports 246, 248 may support the cable holders 220 to position the terminating ends of the cables 106 within the chamber 238, such as relative to the module circuit board 210. The cable supports 246, 248 may include alignment features for aligning the cables 106 and/or the cable holders 220 relative to the base 232. In an exemplary embodiment, the base 232 includes mounting brackets 250 used for mounting the in-line active module 104 to a supporting structure, such as the rack of the communication system 100.

In an exemplary embodiment, the lid 234 includes a heatsink 252 to dissipate heat from the integrated circuit 202. An interior surface 254 of the lid 234 is configured to interface directly with the upper surface of the integrated circuit 202. The lid 234 dissipates heat from the integrated circuit 202. In an exemplary embodiment, the heatsink 252 includes heatsink fins 256 separated by gaps 258. Airflow through the gaps 258 dissipates heat from the heatsink fins 256 to cool the repeater device 200.

Figure 4:
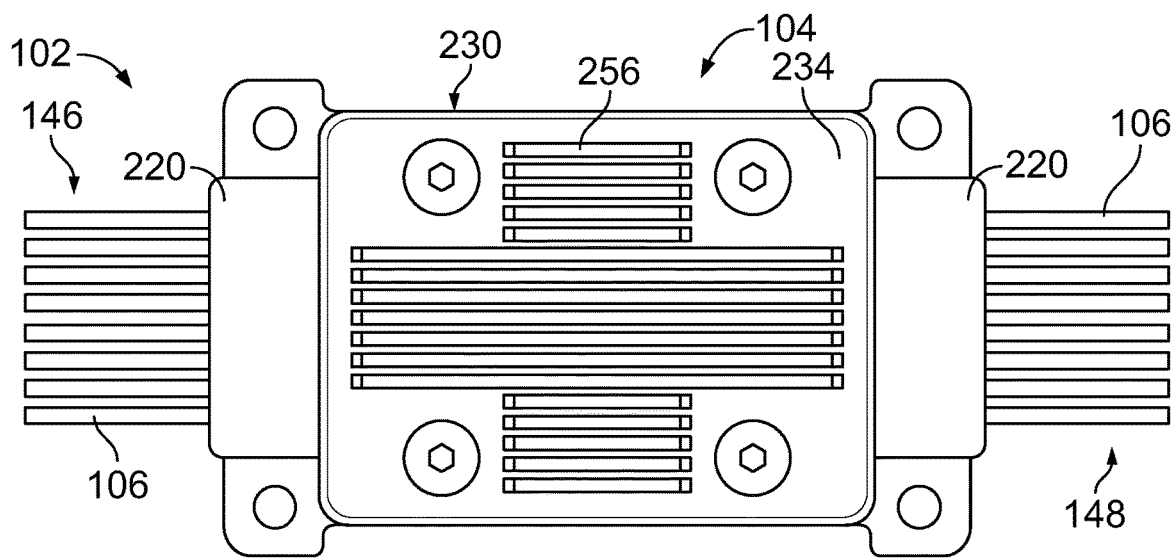
FIG. 4 is a top view of the cable assembly in accordance with an exemplary embodiment showing the in-line active module coupled to the cables.
Figure 5:
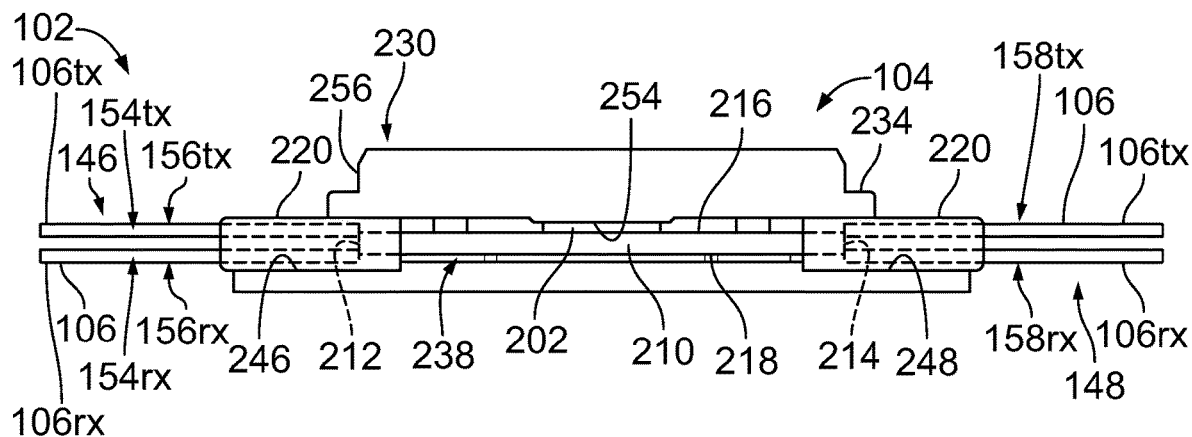
FIG. 5 is a cross-sectional view of the cable assembly in accordance with an exemplary embodiment showing the in-line active module coupled to the cables.
Figure 6:
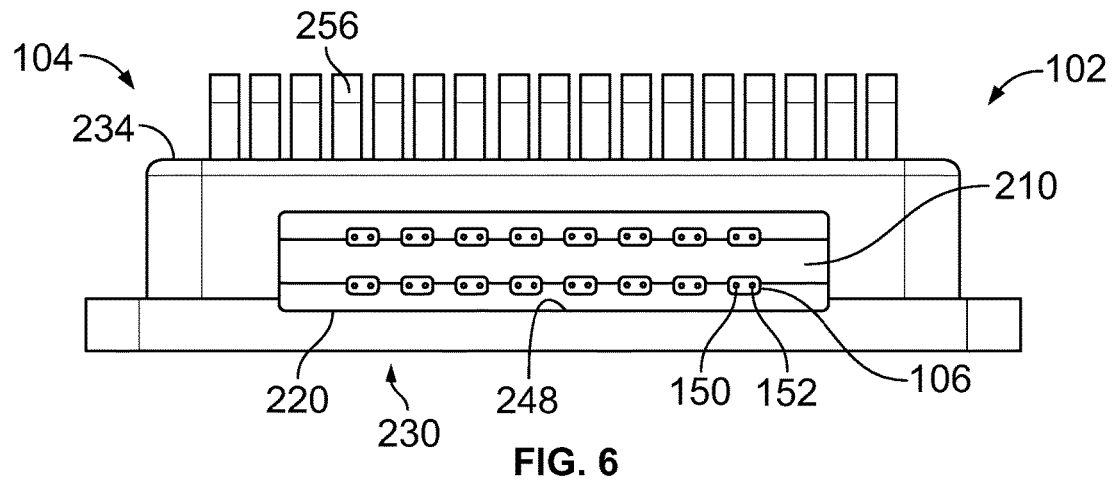
FIG. 6 is an end view of the cable assembly in accordance with an exemplary embodiment showing the in-line active module coupled to the cables.

FIG. 4 is a top view of the cable assembly 102 in accordance with an exemplary embodiment showing the in-line active module 104 coupled to the cables 106. FIG. 5 is a cross-sectional view of the cable assembly 102 in accordance with an exemplary embodiment showing the in-line active module 104 coupled to the cables 106. FIG. 6 is an end view of the cable assembly 102 in accordance with an exemplary embodiment showing the in-line active module 104 coupled to the cables 106.

When assembled, the ends of the first and second sections 146, 148 of the cables 106 are coupled to the module circuit board 210. In the illustrated embodiment, the conductors 150, 152 are terminated directly to the module circuit board 210. The cable holders 220 surround the ends of the sections 146, 148 and the ends 212, 214 of the module circuit board 210 to provide strain relief for the sections 146, 148. The cable supports 246, 248 support the cable holders 220 and/or the ends of the sections 146, 148. The cable holders 220 and the ends of the sections 146, 148 extend into the chamber 238. The module circuit board 210 is received in the chamber 238 and secured in the chamber 238 by the lid 234. When assembled, the interior surface 254 of the lid 234 interfaces directly with the upper surface of the integrated circuit 202 to transfer heat away from the integrated circuit 202. The heatsink fins 256 are provided at the top of the housing 230 to dissipate the heat from the housing 230 to cool the integrated circuit 202.

In an exemplary embodiment, the in-line active module 104 processes both transmit and receive signals. In various embodiments, each of the cables 106 may be used for both transmit and receive communication. However, in other embodiments, the cables 106 may be dedicated for either transmit communication or receive communication. For example, a subset of the cables 106 may be transmit cables 106$tx$ and another subset of the cables 106 may be receive cables 106$rx$. In the illustrated embodiment, both the transmit cables 106$tx$ and the receive cables 106$rx$ are connected to the in-line active module 104. However, in alternative embodiments, only the transmit cables 106$tx$ or the receive cables 106$rx$ are connected to the in-line active module 104 while the other cables bypass the in-line active module 104.

Each transmit cable 106$tx$ defines a transmit channel 154$tx$ including a first transmit portion 156$tx$ extending to the first end 140 and a second transmit portion 158$tx$ extending to the second end 142. Each receive cable 106$rx$ defines a receive channel 154$rx$ including a first receive portion 156$rx$ extending to the first end and a second receive portion 158$rx$ extending to the second end 142. In the illustrated embodiment, the transmit portions 156$tx$, 158$tx$ are connected to the upper surface 216 of the module circuit board 210 and the receive portions 156$rx$, 158$rx$ are connected to the lower surface 218 of the module circuit board 210. Other arrangements are possible in alternative embodiments including having both transmit portions and receive portions connected to the upper surface 216 and/or the lower surface 218.

Figure 7:
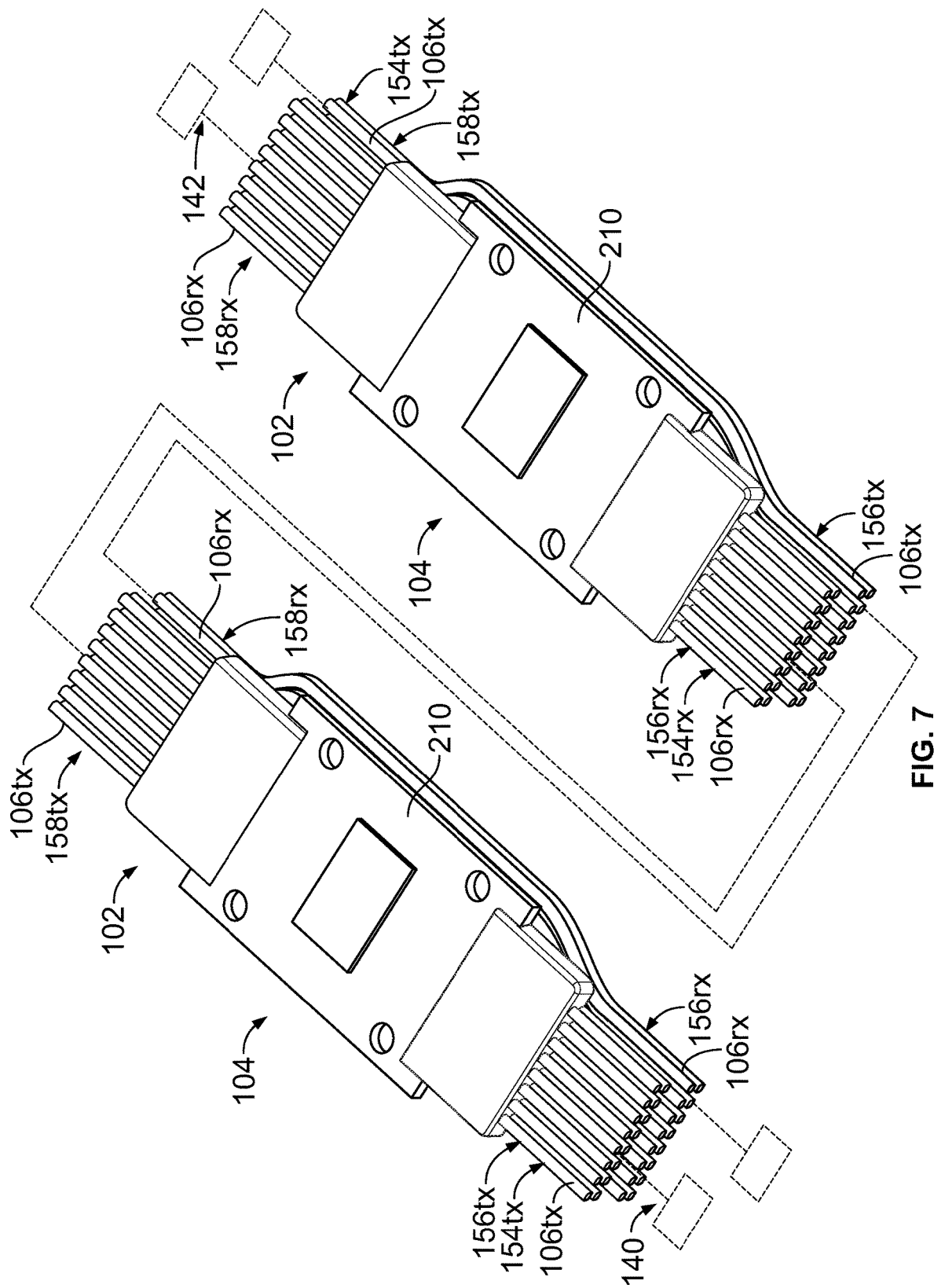
FIG. 7 is a perspective view of the cable assembly in accordance with an exemplary embodiment showing multiple in-line active modules coupled to the cables.
Figure 8:
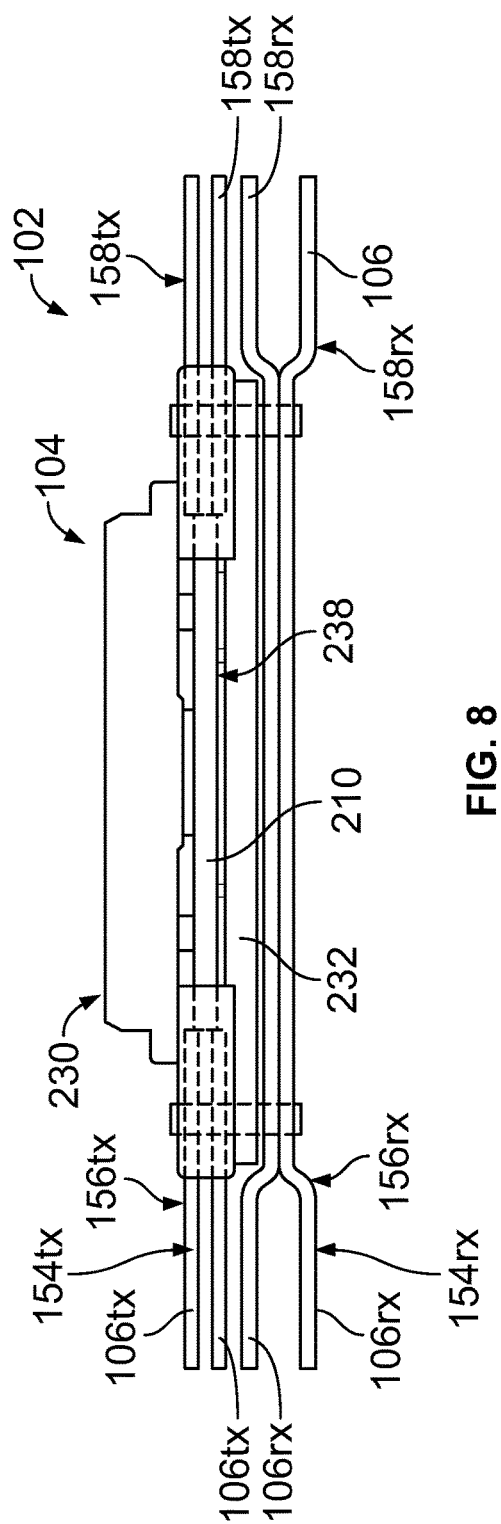
FIG. 8 is a cross-sectional view of the cable assembly in accordance with an exemplary embodiment showing one of the in-line active module coupled to the cables.
Figure 9:
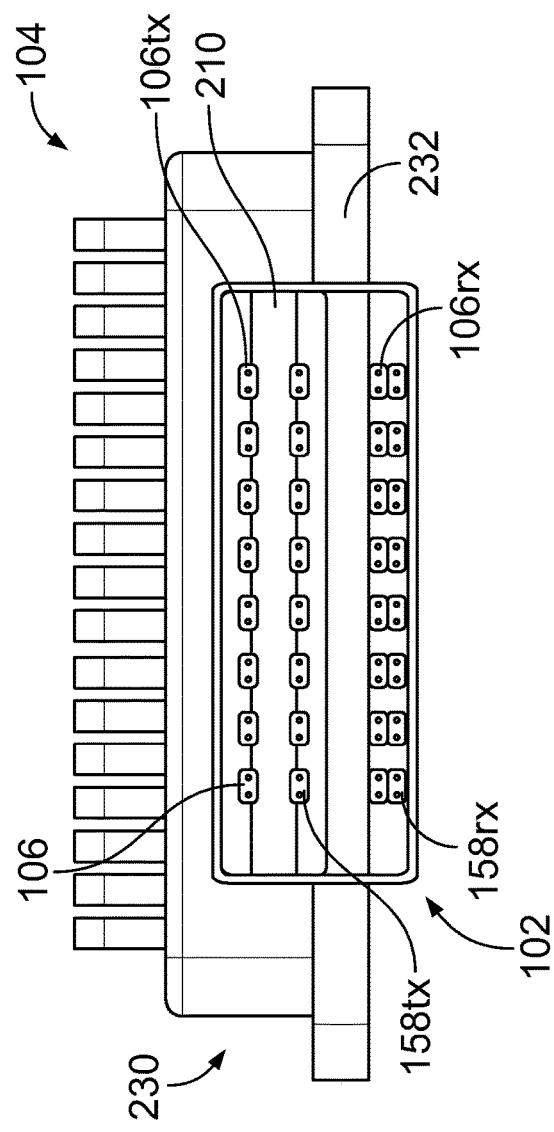
FIG. 9 is an end view of the cable assembly in accordance with an exemplary embodiment showing one of the in-line active module coupled to the cables.

FIG. 7 is a perspective view of the cable assembly 102 in accordance with an exemplary embodiment showing multiple in-line active modules 104 coupled to the cables 106. FIG. 8 is a cross-sectional view of the cable assembly 102 in accordance with an exemplary embodiment showing one of the in-line active module 104 coupled to the cables 106. FIG. 9 is an end view of the cable assembly 102 in accordance with an exemplary embodiment showing one of the in-line active module 104 coupled to the cables 106. In an exemplary embodiment, the in-line active modules 104 are connected to different subsets of the cables 106 at different locations. In other embodiments, all of the cables 106 are connected to the multiple in-line active modules 104 at the different intermediate locations 144, such as when a long cable length is needed.

Figure 10:
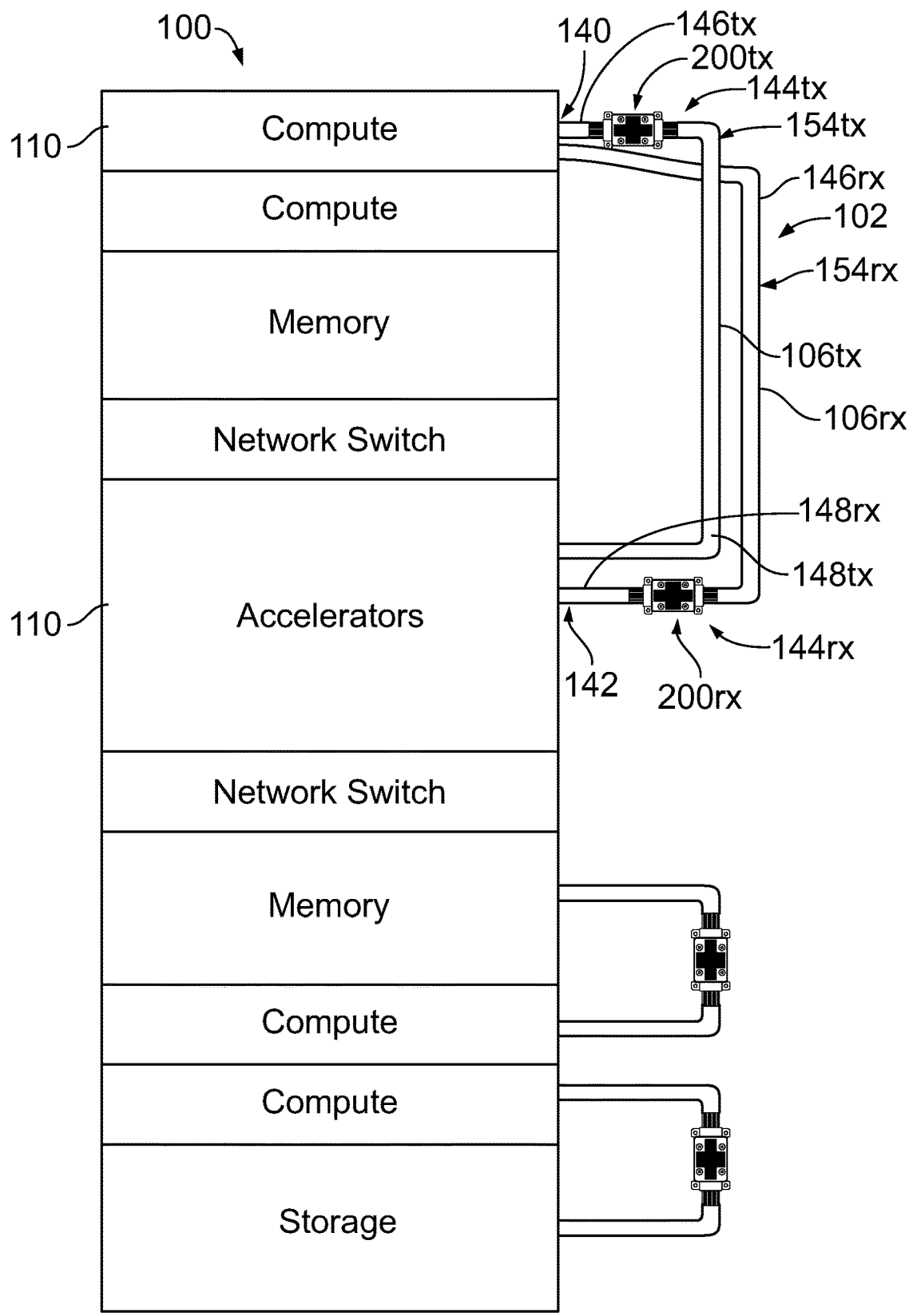
FIG. 10 is a schematic illustration of the communication system in accordance with an exemplary embodiment.

In an exemplary embodiment, the in-line active modules 104 include both a transmit in-line active module 104$tx$ and a receive in-line active module 104$rx$ to processes transmit and receive signals, respectively (see, for example, FIG. 10 showing the transmit in-line active module 104$tx$ and the receive in-line active module 104$rx$). The cables 106 include transmit cables 106$tx$ connected to the transmit in-line active module 104$tx$ and receive cables 106$rx$ connected to the receive in-line active module 104$rx$. The transmit cables 106$tx$ bypass (for example, are not electrically connected to) the receive in-line active module 104$rx$ and the receive cables 106$rx$ bypass the transmit in-line active module 104$tx$.

Each transmit cable 106$tx$ defines the transmit channel 154$tx$ including the first transmit portion 156$tx$ extending between the first end 140 and the transmit in-line active module 104$tx$ and the second transmit portion 158$tx$ extending between the second end 142 and the transmit in-line active module 104$tx$. Each receive cable 106$rx$ defines the receive channel 154$rx$ including the first receive portion 156$rx$ extending between the first end 140 and the receive in-line active module 104$rx$ and the second receive portion 158$rx$ extending between the second end 142 and the receive in-line active module 104$rx$.

In an exemplary embodiment, the transmit cables 106$tx$ and the receive cables 106$rx$ are generally routed within the system together, such as within a cable bundle. However, the transmit cables 106$tx$ and the receive cables 106$rx$ are spliced or separated at different locations along the length of the cable assembly 102. The transmit cables 106$tx$ may be mechanically connected to the housing 230 of the receive in-line active module 104$rx$, such as along the bottom of the base 232 thereof. The transmit cables 106$tx$ are located outside of the chamber 238. However, in alternative embodiments, the transmit cables 106$tx$ may extend into the chamber 238, but are not connected to the module circuit board 210. Similarly, the receive cables 106$rx$ may be mechanically connected to the housing 230 of the transmit in-line active module 104$tx$, such as along the bottom of the base 232 thereof. The receive cables 106$rx$ are located outside of the chamber 238. However, in alternative embodiments, the receive cables 106$rx$ may extend into the chamber 238, but are not connected to the module circuit board 210.

FIG. 10 is a schematic illustration of the communication system 100 in accordance with an exemplary embodiment. The communication system 100 includes the cable assembly 102 used to communicatively couple the communication components 110 along signal paths. The cable assembly 102 includes multiple in-line active modules 104 at different locations along the cable assembly 102. For example, one of the in-line active modules 104 may be closer to one of the communication components 110 while the other in-line active modules 104 may be closer to another of the communication components 110. In the illustrated embodiment, the cable assembly 102 includes the transmit in-line active module 104$tx$ and the receive in-line active module 104$rx$ located at different intermediate locations 144$tx$ and 144$rx$, respectively. The transmit cables 106$tx$ are connected to the transmit in-line active module 104$tx$ and the receive cables 106$rx$ are connected to the receive in-line active module 104$rx$.

The transmit in-line active module 104$tx$ is coupled to the transmit cables 106$tx$ at the first intermediate location 144$tx$ between the first end 140 and the second end 142 of the cable assembly 102. The transmit in-line active module 104$tx$ includes a transmit repeater device 200$tx$ restoring transmit signals transmitting along the transmit channels 154*tx* at the first intermediate location 144*tx*.

The receive in-line active module 104*rx* is coupled to the receive cables 106*rx* at the second intermediate location 144*rx* between the first end 140 and the second end 142 of the cable assembly 102. The receive in-line active module 104*rx* includes a receive repeater device 200*rx* restoring receive signals transmitted along the receive channels 154*rx* at the second intermediate location 144*rx*.

The first intermediate location 144*tx* is remote from the second intermediate location 144*rx*. The first intermediate location 144*tx* is remote from the first end 140 and remote from the second end 142. The second intermediate location 144*rx* is remote from the first end 140 and remote from the second end 142.

The transmit cables 106*tx* have first sections 146*tx* that are continuous from the first end 140 to the transmit in-line active module 104*tx* and second sections 148*tx* that are continuous from the transmit in-line active module 104*tx* to the second end 142. The receive cables 106*rx* have first sections 146*rx* that are continuous from the first end 140 to the receive in-line active module 104*rx* and second sections 146*rx* that are continuous from the receive in-line active module 104*rx* to the second end 142. Lengths of the first sections 146*tx* of the transmit cables 106*tx* are different than lengths of the first sections 146*rx* of the receive cables 106*rx*. Lengths of the second sections 148*tx* of the transmit cables 106*tx* are different than lengths of the second sections 148*rx* of the receive cables 106*rx*.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable assembly comprising:
cables extending between a first end configured to be coupled to a first communication component and a second end configured to be coupled to a second communication component, each cable defining a data channel including a first portion extending to the first end and a second portion extending to the second end; and an in-line active module coupled to the cables at an intermediate location between the first end and the second end, the in-line active module including a repeater device restoring signals transmitting along the channels at the intermediate location, the in-line active module includes a housing having a chamber and a module circuit board received in the chamber, the repeater device being mounted to the module circuit board and located in the chamber, the first portion of the cable extending into the chamber at a first end of the housing, the second portion of the cable extending into the chamber at a second end of the housing.

2. The cable assembly of claim 1, wherein the intermediate location is remote from the first end and remote from the second end.

3. The cable assembly of claim 1, wherein the intermediate location is approximately centered between the first and second ends such that lengths of the first portions are approximately equal to lengths of the second portions.

4. The cable assembly of claim 1, wherein the in-line active module includes a module circuit board having a first end and a second end, the repeater device being coupled to the module circuit board, the first portions being coupled to the first end of the module circuit board, the second portions being coupled to the second end of the module circuit board.

5. The cable assembly of claim 4, wherein module ends of the cables are terminated directly to pads on the module circuit board.

6. The cable assembly of claim 1, wherein the cables are separated at a gap into first and second sections, the in-line active module located in the gap, the cables having module ends where separated, the module ends being terminated to the in-line active module.

7. The cable assembly of claim 1, wherein the repeater device includes an integrated circuit.

8. The cable assembly of claim 1, wherein the housing includes a base and a lid coupled to the base, the lid including a heatsink thermally coupled to the repeater device to dissipate heat from the repeater device.

9. The cable assembly of claim 1, wherein the housing includes a first cable support at the first end of the housing and a second cable support at the second end of the housing, the cable assembly further comprising a first cable holder coupled to the first cable support to hold the cables relative to each other at the first end of the housing and a second cable holder coupled to the second cable support to hold the cables relative to each other at the second end of the housing.

10. The cable assembly of claim 1, wherein the channels have channel lengths between the first end and the second end, the channel lengths being longer than an allowable channel length allowed per protocol specifications, the repeater deice being located at the intermediate location such that the channels along the first portions are shorter than the allowable channel length and such that the channels along the second portions are shorter than the allowable channel length.

11. A cable assembly comprising:
cables extending between a first end configured to be coupled to a first communication component and a second end configured to be coupled to a second communication component, the cables including transmit cables and receive cables, each transmit cable defining a transmit channel including a first transmit portion extending to the first end and a second transmit portion extending to the second end, each receive cable defining a receive channel including a first receive portion extending to the first end and a second receive portion extending to the second end;

a transmit in-line active module coupled to the transmit cables at a first intermediate location between the first end and the second end, the transmit in-line active module including a transmit repeater device restoring transmit signals transmitted along the transmit channels at the first intermediate location; and a receive in-line active module coupled to the receive cables at a second intermediate location between the first end and the second end, the receive in-line active module including a receive repeater device restoring receive signals transmitted along the receive channels at the second intermediate location.

12. The cable assembly of claim 11, wherein the first intermediate location is remote from the second intermediate location, the first intermediate location being remote from the first end and remote from the second end, the second intermediate location being remote from the first end and remote from the second end.

13. The cable assembly of claim 11, wherein the transmit cables have first sections being continuous from the first end to the transmit in-line active module and second sections being continuous from the transmit in-line active module to the second end, and wherein the receive cables have first sections continuous from the first end to the receive in-line active module and second sections continuous from the receive in-line active module to the second end.

14. The cable assembly of claim 13, wherein lengths of the first sections of the transmit cables are different than lengths of the first sections of the receive cables, and wherein lengths of the second sections of the transmit cables are different than lengths of the second sections of the receive cables.

15. The cable assembly of claim 11, wherein the transmit repeater device is one of a re-timer device or a re-driver device, and wherein the receive repeater device is one of a re-timer device or a re-driver device.

16. A communication system comprising:
a first communication component having a first interface;
a second communication component having a second interface; and
a cable assembly extending between the first and second interfaces to transmit data between the first communication component and the second communication component, the cable assembly comprising:
cables extending between a first end coupled to the first communication component and a second end coupled to the second communication component, each cable defining a data channel including a first portion extending to the first end and a second portion extending to the second end; and
an-in-line active module coupled to the cables at an intermediate location between the first end and the second end, the in-line active module including a repeater device restoring signals transmitting along the channels at the intermediate location, the in-line active module includes a housing having a chamber and a module circuit board received in the chamber, the repeater device being mounted to the module circuit board and located in the chamber, the first portion of the cable extending into the chamber at a first end of the housing, the second portion of the cable extending into the chamber at a second end of the housing.

17. The communication system of claim 16, wherein the channels have channel lengths between the first and second communication components, the channel lengths being longer than an allowable channel length allowed per protocol specifications, the repeater deice being located at the intermediate location such that the channels along the first portions are shorter than the allowable channel length and such that the channels along the second portions are shorter than the allowable channel length.

18. The communication system of claim 16, wherein the intermediate location is remote from the first end and remote from the second end.

19. The communication system of claim 16, wherein the in-line active module includes a module circuit board having a first end and a second end, the repeater device being coupled to the module circuit board, the first portions being coupled to the first end of the module circuit board, the second portions being coupled to the second end of the module circuit board.

20. The communication system of claim 16, wherein the cables are separated at a gap into first and second sections, the in-line active module located in the gap, the cables having module ends where separated, the module ends being terminated to the in-line active module.

* * * * *